United States Patent [19]
Sharp

[11] 3,921,322
[45] Nov. 25, 1975

[54] PHOTOGRAPHIC PRINT HOLDER

[75] Inventor: John R. Sharp, Squantum, Mass.

[73] Assignee: Polaroid Corporation, Cambridge, Mass.

[22] Filed: Nov. 5, 1973

[21] Appl. No.: 412,542

[52] U.S. Cl. .............................. 40/104.19; 40/159
[51] Int. Cl.² ......................................... G09F 7/00
[58] Field of Search .... 40/158, 159, 104.18, 104.19

[56] References Cited
UNITED STATES PATENTS

| | | | |
|---|---|---|---|
| 547,377 | 10/1895 | Gillbee | 40/152.1 |
| 1,735,524 | 11/1929 | Buzzerd | 40/104.19 |
| 2,799,107 | 7/1957 | McArthur | 40/159 |
| 3,069,795 | 12/1962 | Lieberman | 40/152 |
| 3,797,146 | 3/1974 | Holes | 40/159 |

Primary Examiner—Robert W. Michell
Assistant Examiner—Wenceslao J. Contreras
Attorney, Agent, or Firm—Kenneth W. Anderson

[57] ABSTRACT

A holder for photographic prints including a plurality of layers at least one of which includes an aperture conforming to the size of the photographic print format. The layers are laminated to define three-sided pockets at opposite ends of the aperture for releasably receiving opposite ends of the photographic print. In a preferred embodiment, a flexible living hinge joins the holder to a coupler whereby the holder may be inserted into a photograph album and secured thereto for use as a page in the photograph album.

4 Claims, 8 Drawing Figures

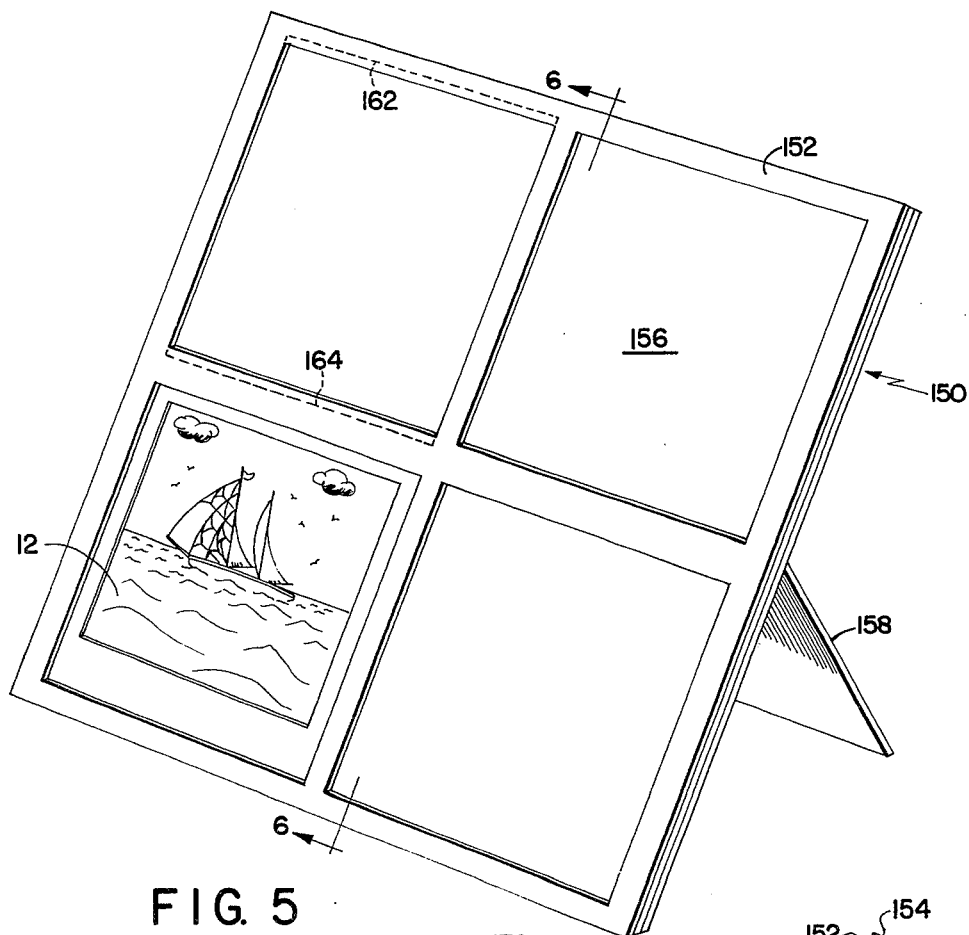
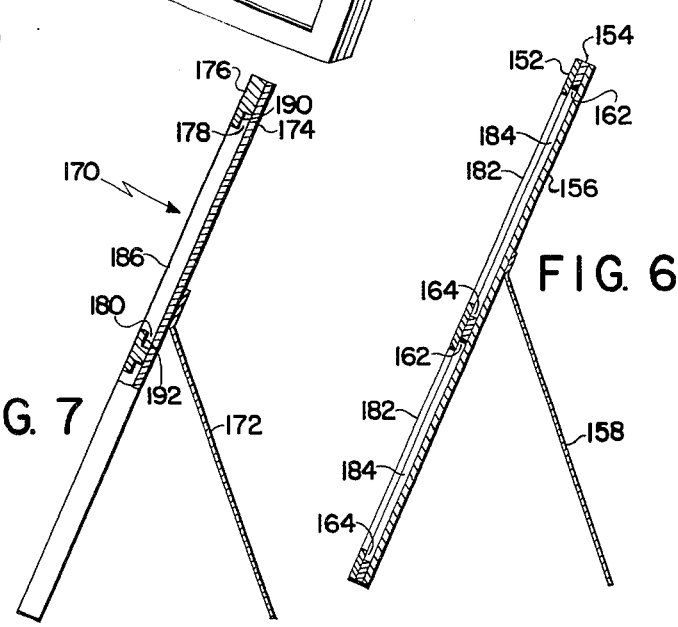
FIG. 5
FIG. 7
FIG. 6

PHOTOGRAPHIC PRINT HOLDER

BACKGROUND OF THE INVENTION

1. Field of the Invention

This invention relates to a holder for photographic prints.

2. Description of the Prior Art

The construction and manufacture of album pages and photographic print holders is not new in the photographic field. Many of the commercially available album pages, however, do not retain a photograph in a most aesthetically pleasing manner. For example, many album pages commonly use adhesive backed paper corners at each of a photographic print's four corners to mount the print to the album page. Although the paper corners permit viewing of the photographic prints, the adhering ability of the corners deteriorates with age and more rapidly with climatic changes resulting in damage to or loss of prized photographic prints. Also, the paper corners usually do not present a clean or neat looking holding arrangement and frequently the photographic prints are not orderly positioned on the page.

Another of the commonly used album pages or print holders includes the variety formed of a clear plastic sheet with photograph sized envelopes formed therein. These holders generally have no means for securing the photographic prints within the envelopes, thereby resulting in a disoriented collage. Additionally, the photographic prints must be viewed through the plastic sheet thereby detracting from the photographic image quality.

Conventional photograph frames also include glass windows requiring maintenance and replacement when broken or fractured and often reflect the surrounding light into the eyes of the viewer. The price of such frames often exceeds the value placed on the scene by the photographer.

Another commonly used holder includes a variety made up of laminar layers wherein a medium is bonded to one surface of a first layer in a preliminary assembly operation and a second layer is subsequently bonded to the first layer thereby capturing the medium between the first and second layers in a final configuration. A similar holder employs a method of utilizing adhesives having different bonding characteristics or whose bonding characteristics are temperature dependent. As illustrated of such a holder, mention may be made of U.S. Pat. No. 3,626,618.

From the foregoing it can be seen that there is a need for a photographic print holder which may be adapted to be incorporated as a page in a photograph album or as a picture frame wherein photographic prints are releasably retained, aesthetically arranged and allows a full unencumbered view of the photographic image.

SUMMARY OF THE INVENTION

The present invention is addressed to a holder adapted for use as a wall plaque, photograph frame, or incorporated within a photograph album as an album page which allows a full unemcumbered view of a photographic image while remaining aesthetically pleasing.

In a preferred embodiment the holder is formed of a plurality of sheets laminated to each other to provide a single sheet containing a plurality of apertures on either side. Photographic prints are flexibly inserted through the apertures, which conform substantially to the size of the photographic print format, into individual three-sided pockets having openings on a fourth side thereof provided inside the holder. The individual pockets, dimensioned to receive two opposing edge portions of the photographic prints, restrictively retain the edge portions thereby limiting longitudinal and lateral movement of the prints when received therein. The photographic prints when received in the individual pockets are releasably retained in registered relationship with the apertures without any covering on the display side of the photograph to detract from the photographic image quality. A flexible hinge including a coupler adapted to receive fastening means provided on an album cover, is laminated within a recess provided along an edge of the holder. The hinge joins the coupler and the holder to each other thereby providing an album page which may be turned with ease to display the photographic prints on both sides thereof.

Accordingly, it is the principal object of the present invention to provide a holder in which photographic prints and/or other similar, flat, thin, flexible objects enjoyed by collectors may be retained in position with provision for easy removal and replacement.

It is a further object of the present invention to provide a holder for retaining a plurality of photographic prints in an aesthetically pleasing manner, which is inexpensive to produce, and durable in use.

Another object is to provide a holder which can be adapted for use as a frame for mounting photographic prints on a wall, a horizontal surface, or for use in a photograph album.

A further object of the invention is to provide an improved holder in which photographic prints and the like can be readily mounted without curling, with rapid insertion and positioning of the prints and the like, and retained by two opposite edges in individual pockets without the use of adhesives or special instruments.

Other objects of the invention will in part be obvious and will in part appear hereinafter.

The novel features that are considered to be characteristic of the invention are set forth with particularity in the appended claims.

BRIEF DESCRIPTION OF THE DRAWINGS

For a fuller understanding of the nature and objects of the invention, reference should be made to the following detailed description taken in conjunction with the accompanying drawings wherein:

FIG. 5 is a perspective view of still another embodiment of the instant invention having holding means for photographic prints on one side thereof;

FIG. 6 is a sectional view taken generally along the line 6—6 of FIG. 5; and

FIG. 7 is a side view of a modified version of FIG. 5 with a portion of the instant invention being partially broken away and shown in section.

DETAILED DESCRIPTION OF THE INVENTION

Figure 1:
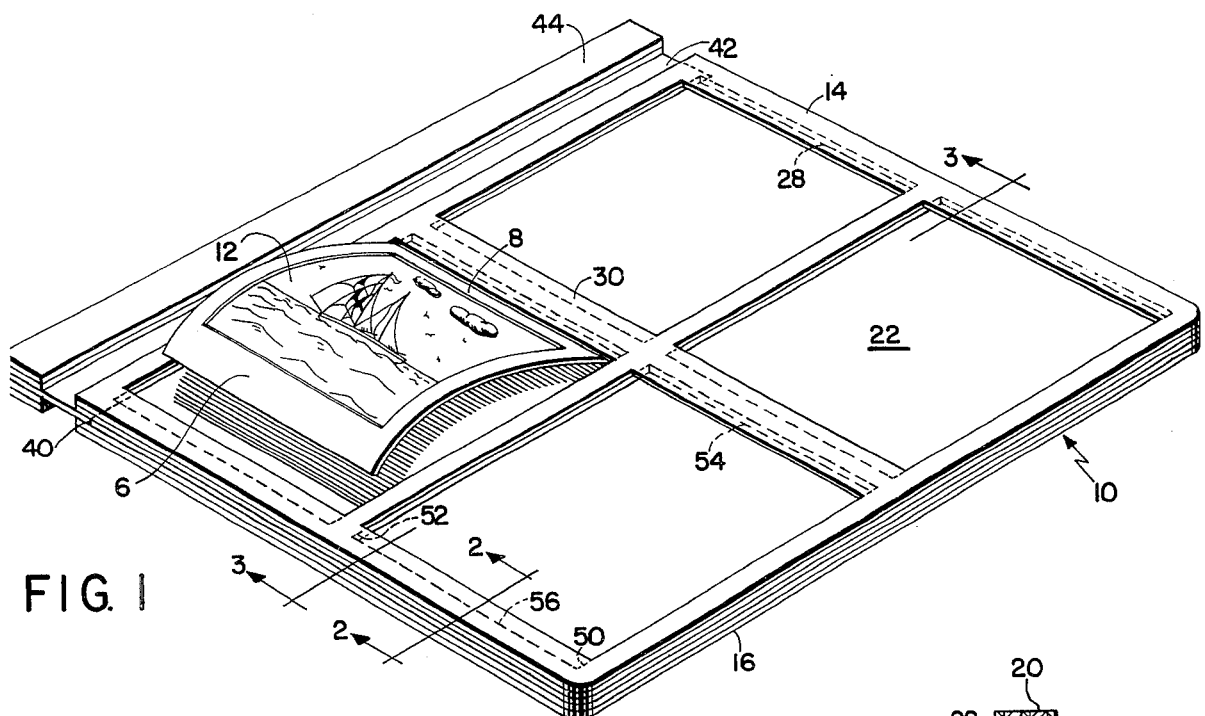
FIG. 1 is a perspective view of a preferred embodiment of the present invention with a coupler attached thereto.
Figure 2:
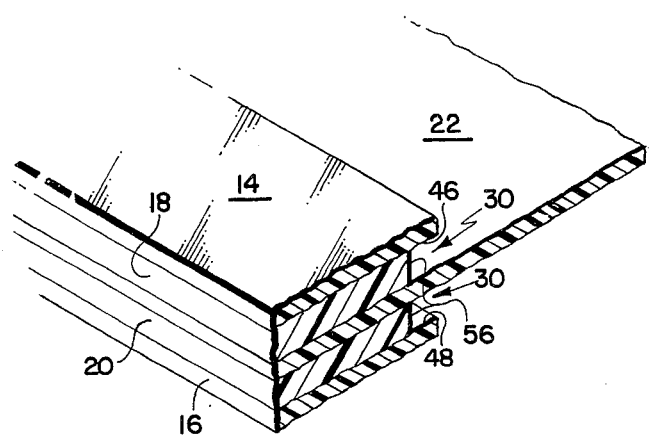
FIG. 2 is a partial, enlarged sectional view taken generally along the line 2—2 of FIG. 1.
Figure 3:
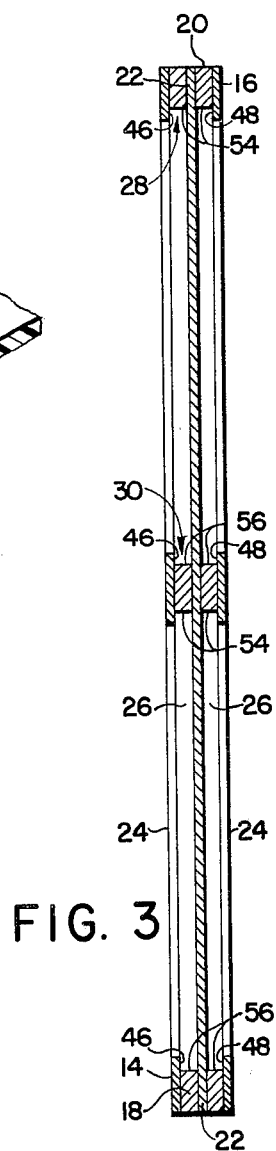
FIG. 3 is a sectional view taken generally along the line 3—3 of FIG. 1.

Referring in more detail and by reference characters to the drawings of FIGS. 1, 2 and 3 which illustrate a preferred embodiment of the invention, a holder 10 capable of displaying photographic prints 12 on both sides thereof is illustrated comprising a pair of facing sheets 14 and 16 including first apertures 24 therein, a pair of spacing sheets 18 and 20 including second apertures 26 therein, and a backing sheet 22 laminated to each other. Each spacing sheet 18 and 20 is positioned between one side of the backing sheet 22 and one of the facing sheets 14 and 16 to provide a single composite sheet having five laminar layers. The facing sheets 14 and 16 may be constructed of any suitable inexpensive, attractive material such as plastic coated paper and include first apertures 24 which are slightly greater in width and slightly less in length than the photographic print 12 or vice versa. The spacing sheets 18 and 20 are preferably constructed of inexpensive cardboard substantially thicker than the material of the facing or backing sheets thereby providing body stiffness to the holder 10. The thickness of the spacing sheets should ideally be substantially equal to the thickness of the picture. Second apertures 26 are equal in width to the first apertures 24 but slightly greater in length whereby pockets 28 and 30 are formed when the sheets are laminated to each other. The backing sheet 22 is preferably constructed of inexpensive MYLAR coated bond paper slightly smaller in width than the facing and spacing sheets such that coterminous positioning of three edges of the backing, facing and spacing sheets provide a recess 40 (see FIG. 1) along one edge of the holder 10 when the sheets are laminated to each other. Recess 40 houses one end of a flexible hinge 42 preferably constructed of unsupported semirigid vinyl having a thickness substantially equal to the backing sheet 22. When the holder 10 is used as a page in an album, the edge of the hinge 42 is positioned in the recess 40 abutting one edge of the backing sheet 22 and laminated between the sides of the spacing sheets 18 and 20. An opposing end of the hinge 42 is substituted for the backing sheet 22 in providing a laminated structure forming a coupler 44 adapted to incorporate the holder 10 into a photograph album. A suitable clamping fixture included on a binding of an album cover provides a fastening fixture whereby a plurality of couplers 44 attached to a plurality of holders 10 are joined together and retained therein. The flexible hinge 42 permits each holder 10 to be turned as a page in a firmly bound book.

The individual pockets 28 and 30 are defined by edges 50 and 52 and edges 54 and 56 of the second apertures 26 beneath the facing sheets 14 and 16. Each side of the backing sheet 22 provides a rear wall for the pockets 28 and 30 such that the photographic print 12 is sandwiched between the rear wall of the pockets 28 and 30 and inner surfaces 46 and 48 of the facing sheets 14 and 16.

The facing sheets 14 and 16 and spacing sheets 18 and 20 are laminated to each other such that first apertures 24 and second apertures 26 are in registered relationship and substantially symmetrically aligned thereby forming individual pockets 28 and 30. The spacing sheets 18 and 20 provide for both easy insertion and removal of the photographic prints 12 by displacing the inner surfaces 46 and 48 a distance substantially equal to the photographic print's thickness from each side of the backing sheet 22 forming the rear wall of pockets 28 and 30.

The photographic prints 12 are inserted through the first apertures 24 by inserting one edge into either pocket 28 or 30 and flexing the print into a position in which the opposite edge of the print may be inserted into the opposite pocket. The separation between pockets 28 and 30 is large enough to permit the photographic print to lie in a flat position upon the side of the backing sheet 22 within the second apertures 24 wherein each photographic print 12 is snugly accommodated and releasably retained behind the facing sheets 14 and 16 in registered relationship with the first apertures 24. The pockets 28 and 30 are dimensioned to releasably receive edge portions 6 and 8 of the photographic prints 12 which are restricted from longitudinal movement therein by edges 54 and 56 and laterally by edges 50 and 52.

Figure 4:
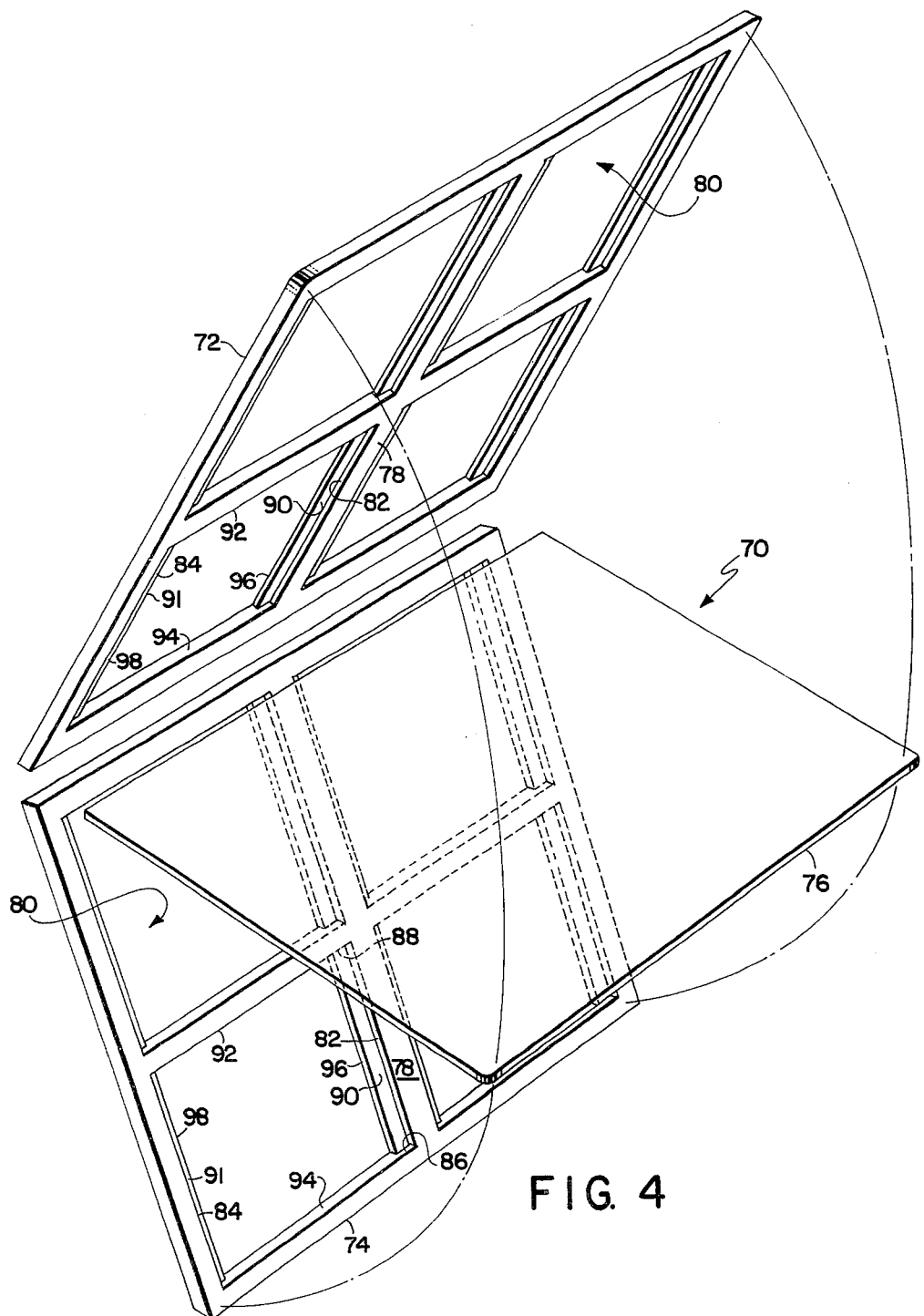
FIG. 4 is an exploded perspective view of an alternative embodiment of the invention having three laminar layer construction.
Figure 4A:
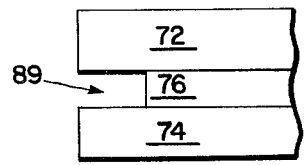
FIG. 4a is a partial end view of the assembled alternative embodiment shown in FIG. 4.

A modification of the present invention is illustrated in FIGS. 4 and 4a wherein a holder 70, capable of displaying photographic prints on both sides thereof, is constructed of three laminar layers. Facing sheets 72 and 74 include apertures 80 slightly greater in width, as defined by edges 92 and 94, and slightly less in length, as defined by edges 96 and 98, than the photographic prints and further include on one side behind the apertures 80 steps 90 and 91 at opposing ends of each aperture. Rear edges 82 and 84 of the steps 90 and 91 are spaced apart sufficiently to permit a photographic print to lie in a flat position when positioned therebetween below surface 78 of the facing sheets 72 and 74. Edges 86 and 88 define the width of the steps 90 and 91 and are common with edges 92 and 94 of the apertures 80. The sides of the facing sheets 72 and 74 bearing the steps 90 and 91 are laminated to each side of a backing sheet 76 whereby individual pockets are formed between the sides of the backing sheet 76 and steps 90 and 91 of the step bearing side of the facing sheets 72 and 74. The individual pockets snugly accommodate and releasably retain edges of the photographic prints behind each aperture 80 between the edges 86 and 88 and edges 82 and 84 which restrict movement of the photographic prints laterally and longitudinally, respectively, when received therein.

The photographic prints are inserted through the apertures 80, with the image side facing the installer, by inserting one edge into either pocket and flexing the print into a position in which the opposite edge may be inserted into the other pocket. Once inserted, the photographic print is retained therein between one side of the backing sheet 76 and the steps 90 and 91 and may be subsequently removed by re-flexing the photographic print until one edge of the print is free of its pocket and sliding the opposite edge from behind the aperture 80.

A recess 89 is provided along one edge of holder 70, see FIG. 4a, wherein one edge of a flexible hinge having a coupler attached thereto (as viewed in FIG. 1) may be adjoined to one edge of the backing sheet 76 between facing sheets 72 and 74. The backing sheet 76 is slightly less as measured in one direction than the facing sheets 72 and 74 thereby providing the recess 89 when facing sheets 72 and 74 and backing sheet 76 are aligned along three edges coterminously and laminated to each other.

Still another modified version of the present invention is shown in FIGS. 5 and 6 wherein a holder 150 capable of displaying photographic prints 12 on one side thereof is illustrated comprising a facing sheet 152, including a plurality of first apertures 182 therein, a spacing sheet 154 including second apertures 184 therein, and a backing sheet 156 laminated to each other. The spacing sheet 154 is positioned between one side of the backing sheet 156 and the facing sheet 152 to provide a single sheet of three laminar layers. Second apertures 184 are equal in width to the first apertures 182 but slightly greater in length whereby pockets 162 and 164 for releasably retaining the photographic print 12 therein are formed when the sheets are laminated to each other. A non-photographic print bearing side of the backing sheet 156 has a foldable easel-providing member 158 attached thereto whereby the holder may be supported when used as a frame for displaying photographic prints.

A modification of the invention shown in FIG. 5 is presented in FIG. 7 wherein a holder 170 capable of displaying photographic prints on one side thereof is constructed of two laminar layers. Facing sheet 176 includes apertures 186 slightly greater in width and slightly less in length than a photographic print retained therein or vice versa. The facing sheet 176 further includes on one side thereof behind the apertures 186 steps 190 and 192 at opposing end of each aperture spaced apart sufficiently to permit the photographic print to lie in a flat position within pockets 178 and 180 formed by laminating an obverse side of a backing sheet 174 to a side of the facing sheet bearing the steps 190 and 192. The photographic prints are releasably retained in the pockets 178 and 180 between the obverse side of the backing sheet 174 and the inner edge of steps 190 and 192. A foldable easel-providing member 172 is attached to a reverse side of the backing sheet 174 whereby the holder 170 may be supported when used as a frame for photographic prints.

It should be noted that holders 10, 70 and 150 are not limited for use with photographic prints of the self-developing variety. If desired, any of the apertures and/or pockets may be enlarged or reduced to accommodate any sized prints or objects; such as postage stamps.

Due to the holder construction, an album filled with prints will be no thicker than an empty album if the coupler 44 is incorporated as a means of joining the holder to the album. The holder 10 and coupler 44 have an aggregate thickness substantially the same thereby avoiding the bulging appearance typical of many photograph albums.

From the foregoing, it is apparent that the holders are inexpensive, durable, and easily constructed units which provide for both easy insertion and removal of photographic prints without reliance upon methods previously employed in the prior art. The holders 10 and 70 also permit double sided mounting with an unencumbered full view of the mounted photographs without any portion of the image being hidden. Therefore, a clean looking and aesthetically pleasing mounting holder for photographs is provided.

This invention may be practiced or embodied in still other ways without departing from the spirit and essential character thereof. The specific and preferred embodiments described herein are therefore to be considered illustrative and not restrictive, the scope of the invention being indicated by the appended claims and all variations which come within the meaning of the claims are intended to be embraced therein.

What is claimed is:

1. A holder for photographic prints comprising: a flexible hinge including a coupler adapted to receive fastening means for retaining said holder in a photograph album;
a pair of facing sheets each having at least one first aperture therein;
a pair of spacing sheets, substantially equal in size to said pair of facing sheets, each including second apertures having a greater dimension as measured in a first direction and equal in number to said first apertures; and
a backing sheet, slightly less as measured in one direction than said pair of spacing sheets, having one of said spacing sheets disposed on each side thereof, each said facing sheets being superposedly positioned and laminated to a second side of said spacing sheets with said first and second apertures in substantially symmetrical alignment whereby said greater dimension of said second aperture cooperating with a portion of said each side of said backing sheet and one side of said facing sheet define individual pockets at opposing ends of said first aperture for releasably receiving through said first aperture and thereupon restrictively retaining edge portions of the photographic prints on both sides of said holder, at least three edges of said backing, facing and spacing sheets being laminated coterminously to define a recess along one edge of said holder wherein one edge of said flexible hinge is positioned and secured therein.

2. A holder as defined in claim 1 wherein each of said individual pockets includes three sealed edges spaced a distance sufficient to snugly accommodate the edge portions of the photographic print therebetween whereby the photographic print is restrictively retained in registered relationship with said first apertures within said holder and restricted in longitudinal and lateral movement.

3. A holder as defined in claim 2 wherein each of said individual pockets further includes a pair of retaining walls formed by said sides of said backing and facing sheets spaced by said spacing sheets a distance sufficient to snugly accommodate a thickness of the edge portions therebetween whereby the photographic print is retained within said holder when used as a page in the photographic album.

4. A holder for photographic prints comprising:
a flexible hinge including a coupler adapted to receive fastening means for retaining said holder in a photographic album;
a backing sheet whereupon the photographic prints are supported on each side thereof; and
a pair of facing sheets each having at least one aperture therein and laminated to opposing sides of said backing sheet to form a single composite sheet having first and second sides, said facing sheets further including on one side thereof a step at opposing ends of each said aperture, said steps cooperating with portions of said opposing sides of backing sheet to define individual pockets for releasably receiving through said aperture and thereupon restrictively retaining edge portions of the photographic prints on said first and second sides of said holder, said pair of facing sheets being substantially equal in size and having a dimension as measured in one direction greater than a corresponding dimension of said backing sheet, at least three edges of said backing sheet and said facing sheets being laminated coterminously to each other to define a recess along one edge of said holder wherein one edge of said flexible hinge is positioned and secured therein.

* * * * *